(12) United States Patent
Fujimori

(10) Patent No.: US 7,975,251 B2
(45) Date of Patent: Jul. 5, 2011

(54) METHOD, RECORDING MEDIUM, AND DESIGN SUPPORT SYSTEM FOR DESIGNING AN ELECTRONICS DEVICE

(75) Inventor: Shogo Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 596 days.

(21) Appl. No.: 12/041,216

(22) Filed: Mar. 3, 2008

(65) Prior Publication Data
US 2008/0222593 A1 Sep. 11, 2008

(30) Foreign Application Priority Data
Mar. 9, 2007 (JP) ................. 2007-060971

(51) Int. Cl.
*G06F 17/50* (2006.01)

(52) U.S. Cl. .................. 716/127; 716/137

(58) Field of Classification Search .............. 716/2, 4, 716/5, 11–15, 127, 137
See application file for complete search history.

(56) References Cited

U.S. PATENT DOCUMENTS

| | | | | |
|---|---|---|---|---|
| 6,803,655 B2 * | 10/2004 | Fujio et al. | .................. | 257/724 |
| 2003/0083856 A1 | 5/2003 | Yoshimura et al. | | |
| 2004/0225487 A1 | 11/2004 | Iwakura et al. | | |
| 2006/0036980 A1 | 2/2006 | Kobayashi | | |
| 2008/0291602 A1 * | 11/2008 | Devoe | .................. | 361/306.3 |
| 2009/0034155 A1 * | 2/2009 | Devoe | .................. | 361/306.3 |

FOREIGN PATENT DOCUMENTS

| | | |
|---|---|---|
| JP | 2003-141205 | 5/2003 |
| JP | 2004-234618 | 8/2004 |
| JP | 2004-334654 | 11/2004 |
| JP | 2006-031510 | 2/2006 |

\* cited by examiner

*Primary Examiner* — Vuthe Siek

(74) *Attorney, Agent, or Firm* — Staas & Halsey LLP

(57) ABSTRACT

A design method includes creating power supply planes in each layer of a circuit board, from CAD data of the circuit boards whereby the power supply planes form one power supply conductor interconnect and supply power or connect to ground, expanding the shape of the power supply planes by a predetermined width, creating power supply pairs which are formed by opposing portions wherein two power supply planes existing in different layers are separated by an insulator and correcting the parameter by use of the mesh area.

14 Claims, 16 Drawing Sheets

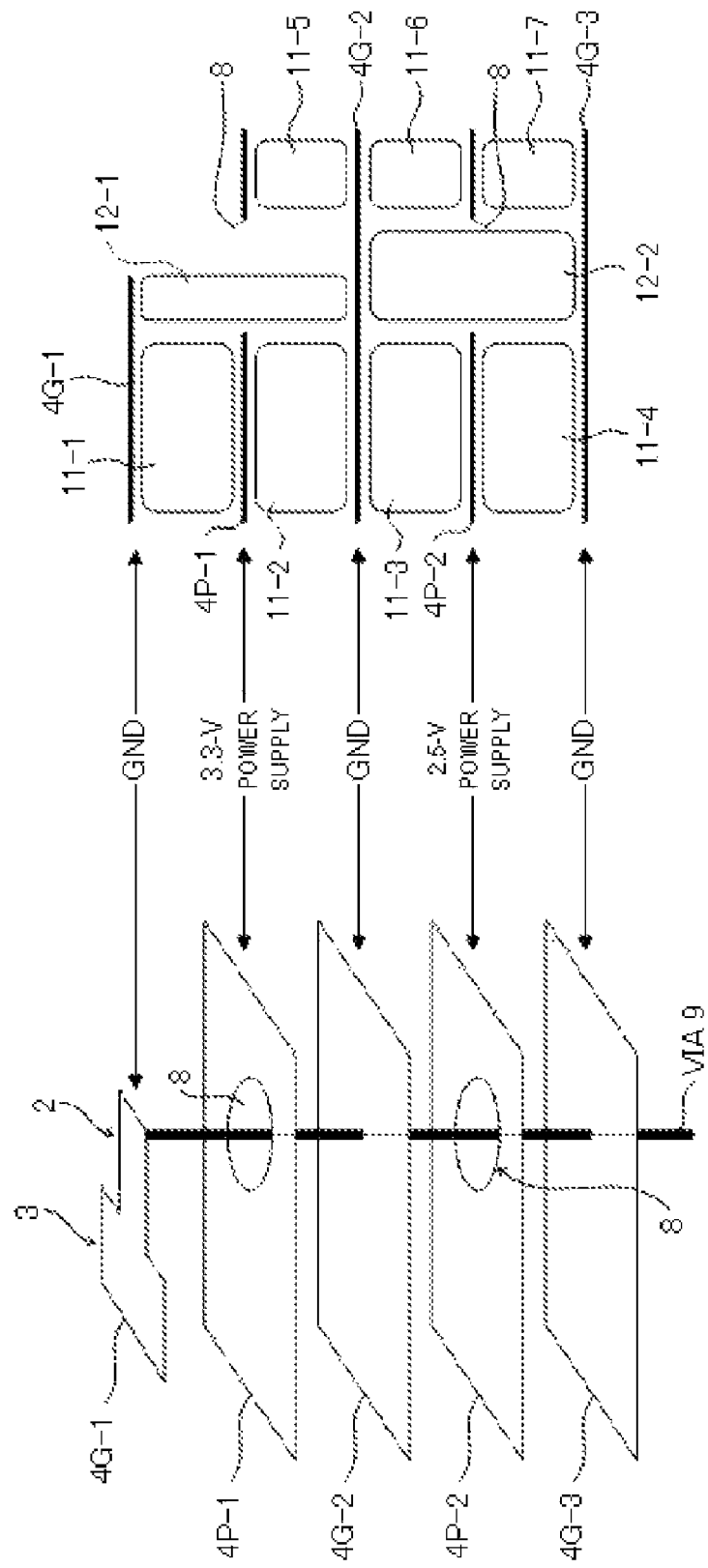

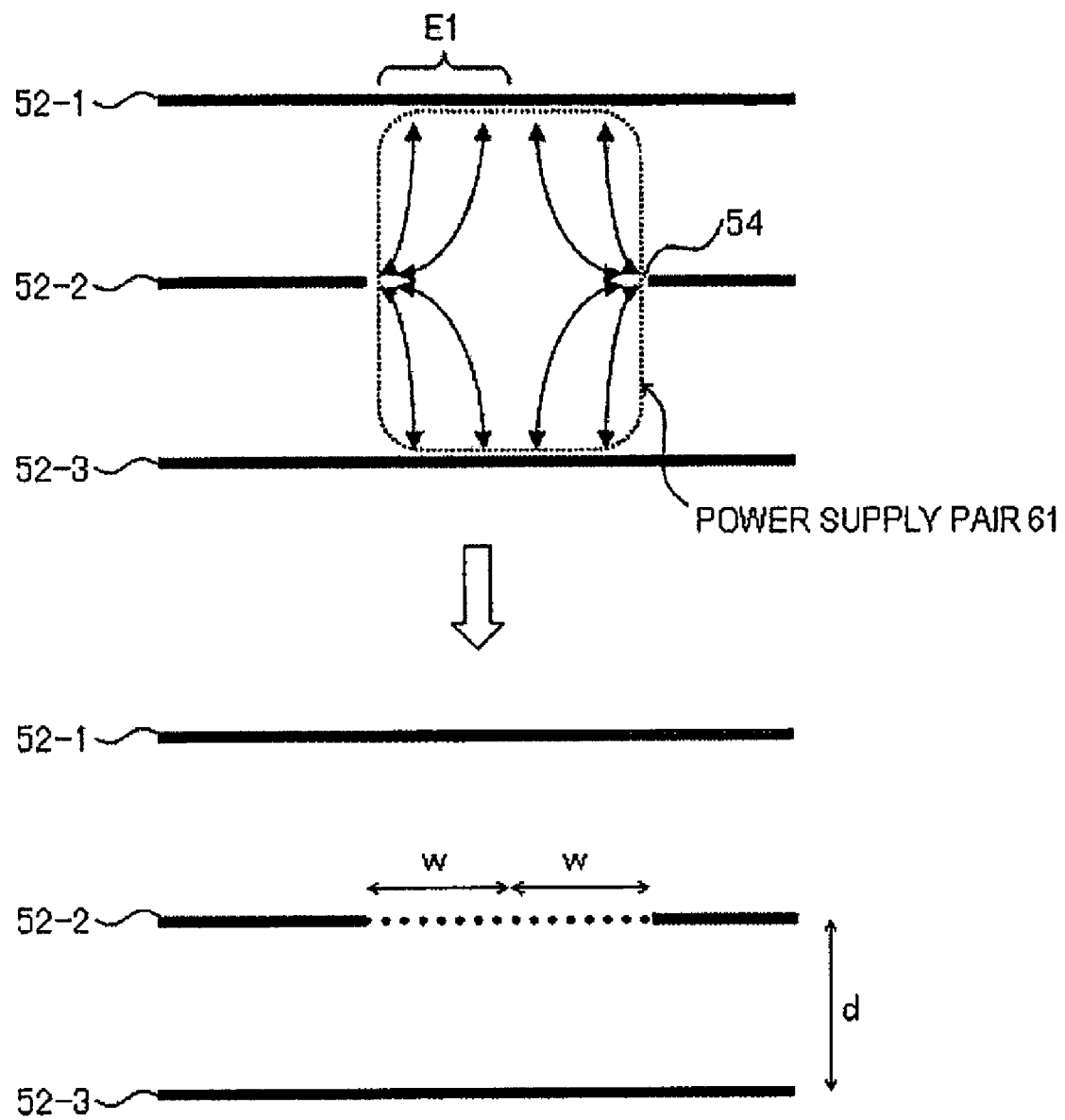

FIG. 10B
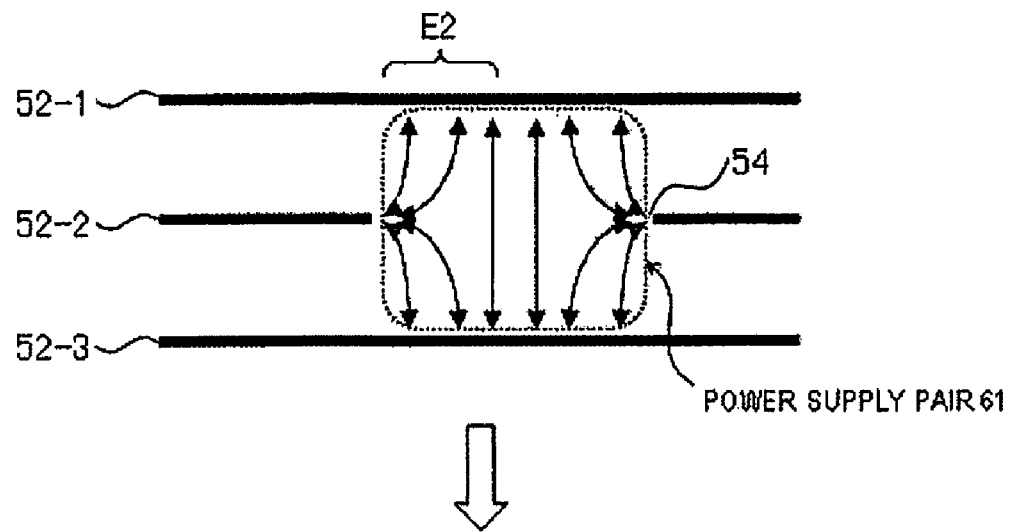
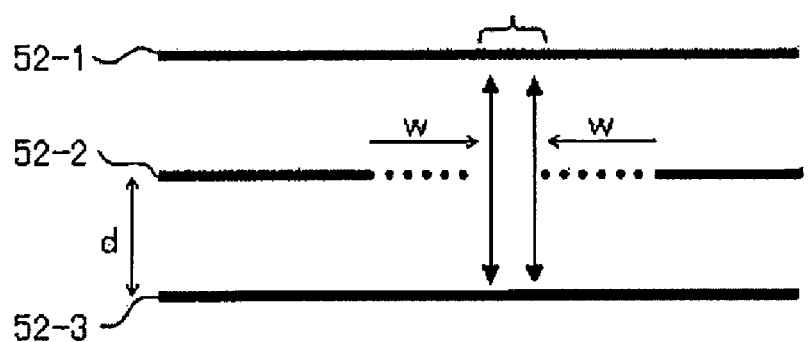
A RANGE WHICH IS NOT AFFECTED BY THE END OF THE POWER SOURCE PLANES REMAINS.

| DISTANCE D FROM LSI TO BE MONITORED | EXPANSION WIDTH W OF THE POWER SUPPLY PLANES |
|---|---|
| D ≦ 20mm | BASIC EXPANSION WIDTH wb × 1.0 |
| 20mm < D ≦ 60mm | BASIC EXPANSION WIDTH wb × 2.0 |
| 60mm < D ≦ 120mm | BASIC EXPANSION WIDTH wb × 3.0 |
| 120mm < D | BASIC EXPANSION WIDTH wb × 4.0 |

… continued

METHOD, RECORDING MEDIUM, AND DESIGN SUPPORT SYSTEM FOR DESIGNING AN ELECTRONICS DEVICE

CROSS-REFERENCE TO RELATED APPLICATIONS

This application is related to and claims the benefit of priority from Japanese Patent Application No. 2007-60971, filed on Mar. 9, 2007, the entire contents of which are incorporated herein by reference.

BACKGROUND

1. Field

The present art relates to a design method and recording medium, and more particularly relates to a method of designing a power supply which is suitable for analyzing power-supply noise occurring in circuit boards such as printed circuit boards (PCB), multichip modules (MCM), or LSI packages or a ground layer analysis model, and a recording medium which is readable by a computer. The present art relates to a design apparatus and CAD system for generating the power source or ground layer analysis model according to such a design method.

2. Description of the Related Art

An analysis model may be created from the circuit board design data using a CAD system. The analysis model may be used to run a circuit simulation. A designer can use the above-mentioned circuit simulation to analyze electrical characteristics of the power source, the ground layer, or the circuit operation of the circuit board.

One such circuit simulator is SPICE (Simulation Program with Integrated Circuit Emphasis). FIG. 1 shows a procedure for generating a conventional power supply mesh model. FIG. 2 is a perspective view of the data generated by the power supply mesh model generation procedure, patterns, and a model. The related art procedure obtains the CAD data of the circuit board, which is subject to the design shown in FIG. 2A, in operation S1. Data for the power supply plane 4 (hereinafter this will simply be referred to as "power supply plane data"), like that shown in FIG. 2B, is created in operation S2. In FIG. 2A, 1 is a surface pattern, 2 is a line pattern, and 3 is a component pin pad. The power supply plane in the CAD data is composed of multiple polygons or line data, but the power supply plane is defined herein as a shape resulting from the synthesis of an interconnect to a power supply conductor in each layer. Power supply planes are also referred to as ground planes.

A power supply pair is extracted in operation S3. One power supply pair is defined herein as the portion in which two power supply planes existing in different layers oppose each other with an insulator between them. A node 6, which is connected by a node link 5 like that shown in FIG. 2C, is generated in operation S4. The shape of a power supply plane 4 is split into a mesh 7 as shown by the hatching in FIG. 2C in operation S5.

The parameters for each inductance, each capacitance, and each resistance are calculated in operation S6. The above-mentioned parameters are corrected in operation S7. Parameter correction is described hereinafter. Each mesh 7 is converted into an equivalent circuit such as an inductance, capacitance, or resistance in operation S8. A power supply mesh model, i.e. analysis model, like that shown in FIG. 2D is then generated. In FIG. 2D, L represents inductances, C represents capacitances, and R represents resistances.

Japanese Laid-open Patent Publication 2003-141205 and Japanese Laid-open Patent Publication 2004-334654 disclosed calculations for the inductance L inductance value and capacitance C capacitance value parameters for the analysis model based on the above-mentioned power supply pair.

Japanese Laid-open Patent Publication 2004-234618 and Japanese Laid-open Patent Publication 2006-31510 disclosed a method of analyzing power supply noise and a method of analyzing jitter caused by power supply noise.

The power supply or ground plane of the circuit board has many holes such as VIA clearance holes. Many miniature power supply pairs are formed from opposing power supply planes through these holes. Many miniature power supply pairs such as these are particularly formed in multilayer boards with two or more power supply layers. Miniature power supply pairs such as these account for a majority of all power supply pairs. The analysis model parameters are calculated based on the power supply pairs, so processing time increases when there are many power supply pairs.

FIG. 3 shows miniature power supply pairs. Identical symbols were provided to identical portions in FIG. 2 and FIG. 3. FIG. 3A shows power supply planes in the VIA periphery. FIG. 3B shows a cross section of power supply planes.

In FIG. 3, 4G-1 through 4G-3 indicate power supply planes (ground planes). 4P-1 and 4P-2 indicate power supply planes. 8 indicates a VIA clearance holes. 9 indicates VIA, GND indicates the ground electric potential. 3.3 V and 2.5 V indicate the power supply voltage. In FIG. 3B, 11-1 through 11-7 indicate power supply pairs. 12-1 and 12-2 indicate miniature power supply pairs. The miniature power supply pair 12-1 is formed from opposing ground planes 4G-1 and 4G-2 through the VIA clearance hole 8. The miniature power supply pair 12-2 is formed from opposing ground planes 4G-2 and 4G-3 through the VIA clearance hole 8.

The parameters of the analysis model can be calculated using the parallel flat plane Expression (1) and Expression (2) like those shown below. However, these Expressions (1) and (2) do not take into account the effect of the edge portion of the power supply planes. Therefore, the above-mentioned calculated parameters are greater than the actual value, so the precision of the analysis results will worsen.

Expression (1) calculates the inductance value L of inductance L between nodes. $\mu O$ indicates the permeability, d indicates the distance between the layers comprising the power supply pair, and W indicates the width along the node link between the nodes in the power supply mesh. Also, expression (2) calculates the capacitance value C for capacitance C which is located between the nodes. $\epsilon O$ indicates the vacuous dielectric constant ($8.854 \times 10{-12}$ F/m), $\epsilon r$ indicates the relative dielectric constant of the insulators located between the components of the power supply pair, S indicates the area of the mesh created by splitting the power supply pair, and d indicates the distance between the layers comprising the power supply pair.

$$L = \mu O \times d / W \qquad \text{Expression (1)}$$

$$C = \epsilon O \times \epsilon r \times S / d \qquad \text{Expression (2)}$$

Corrections made to the parameters from the layer position of the power supply plane near the power supply pair improve the precision of above-mentioned analysis results when the parameters for an analysis model are calculated.

FIG. 4 is a cross-sectional view showing the effect of the edge portion of the power supply planes. Identical symbols were provided to identical portions in FIG. 3 and FIG. 4. in FIG. 4, the arrows indicate the effect on the parameters for the edge portion of the power supply planes. FIG. 4A shows the power supply planes on the periphery of the VIA when the parameters are not corrected. FIG. 4B shows the power supply planes when the parameters are corrected. FIG. 4A takes into account the effect of the ground planes 4G-1 and 4G-2 which form the miniature power supply pair 12-1. However, FIG. 4A does not take into account the effect of the edge portion 15 of the power supply plane 4P-1 which marks off the VIA clearance hole 8. FIG. 4B shows a correction which takes into account the effect of the ground planes 4G-1 and 4G-2 which form the miniature power supply pair 12-1 and the effect of the edge portion 15 of the power supply plane 4P-1 which marks off the VIA clearance hole 8.

FIG. 5 shows a parameter correction process which is performed by operation S7 shown in FIG. 1. A node link 5 is obtained between the nodes 6 to be corrected in operation S71. The next layer for searching after a certain layer in the node 5 to be corrected is targeted in operation S72. The power supply plane 4 is searched within a constant distance from the node link 6 between the nodes 5 to be corrected in operation S73. Whether or not the power supply plane 4 was found within a constant distance from the node link 6 between the nodes 5 to be corrected is judged in operation S74. If the judgment result is NO, then whether or not there is a subsequent layer is determined in operation S75. If the judgment result of operation S75 is YES, then the process proceeds to operation S76. If the judgment result is NO, then this process ends. The next layer for searching is targeted in operation S76. The process returns to operation S73. On the other hand, if the judgment result of operation S74 is YES, the parameters are recalculated based on the distance between a certain layer in the node 5 to be corrected and a certain layer in the power supply plane 4 that was found in operation S77, and then the process ends.

A parameter correction process such as this improves the analysis precision. However, the processing time increases as the number of power supply planes or power supply pairs increases.

Previously, when designing a power supply suited for analyzing power supply noise generated in a circuit board or a ground layer analysis model, there was a problem in which the degree to which the analysis precision could be improved was limited unless the parameter correction process was performed and the processing time increased even though the parameter correction process was performed and the analysis precision was improved.

SUMMARY

At this point, an object of the present art is to provide a design method and apparatus wherein it becomes possible to improve the analysis precision without increasing the processing time when designing a power supply suited for analyzing power supply noise generated in a circuit board or a ground layer analysis model, and to provide a CAD system program and storage medium.

According to an aspect of an embodiment, a method includes creating power supply planes in each layer of a circuit board, from CAD data of the circuit board, whereby the power supply planes form one power supply conductor interconnect and supply power or connect to ground, expanding the shape of the power supply planes by a predetermined width, creating power supply pairs which are formed by opposing portions wherein two power supply planes existing in different layers are separated by an insulator using the expanded power supply planes, generating nodes for the expanded power supply planes and the power supply pairs, calculating a parameter between nodes, dividing the expanded power supply planes into mesh, calculating the parameters between the nodes, calculating a mesh area corresponding to an expansion portion of the power supply planes in each the mesh by comparing each mesh shape with the power supply plane shape, and correcting the parameter by use of the mesh area.

It is possible to realize a design method and apparatus, CAD system, program, and storage medium wherein it becomes possible to improve the analysis precision without increasing the processing time when designing a power supply or ground analysis model suited for analyzing power supply noise generated in a circuit board.

The above-described embodiments of the present art are intended as examples, and all embodiments of the present art are not limited to including the features described above.

BRIEF DESCRIPTION OF THE DRAWINGS

FIG. 3 shows miniature power supply pairs;

FIG. 10A shows the effect and expanded width of the edge portion of the power supply planes by the interlayer distance;

FIG. 10B shows the effect and expanded width of the edge portion of the power supply planes by the interlayer distance;

DETAILED DESCRIPTION OF THE PREFERRED EMBODIMENTS

Figure 1:
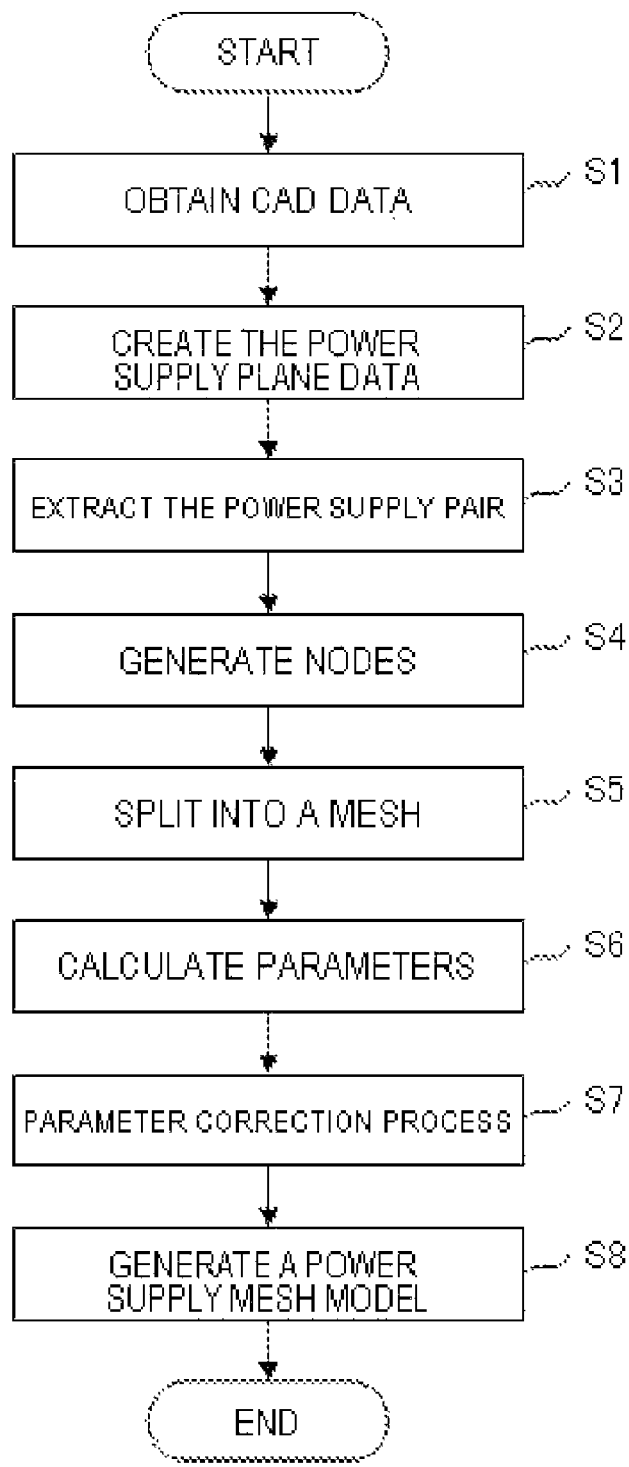
FIG. 1 shows the procedure for generating a conventional power supply mesh model.
Figure 2A:
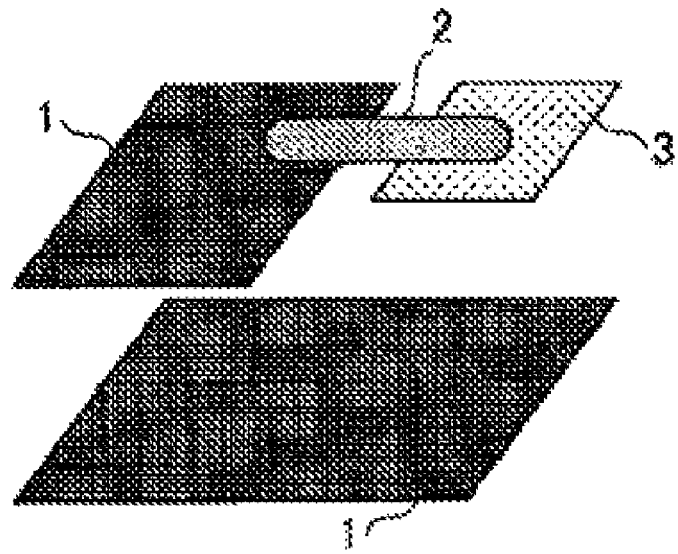
FIG. 2A shows the data which is generated by the procedure for generating a power supply mesh model.
Figure 2B:
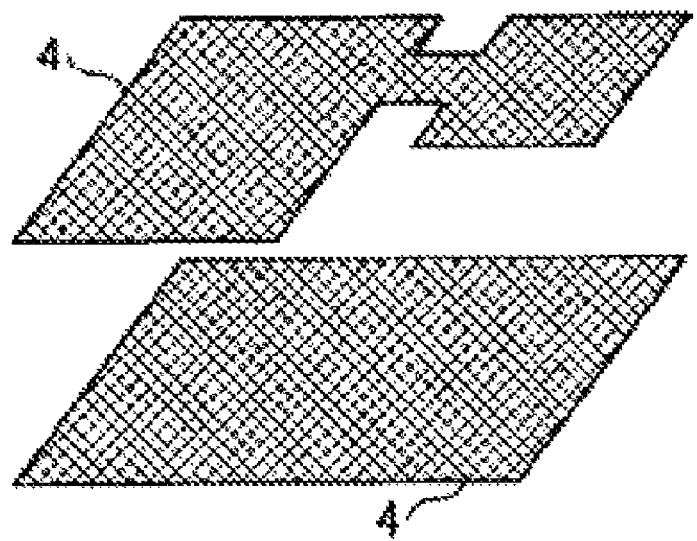
FIG. 2B shows the data which is generated by the procedure for generating a power supply mesh model.
Figure 2C:
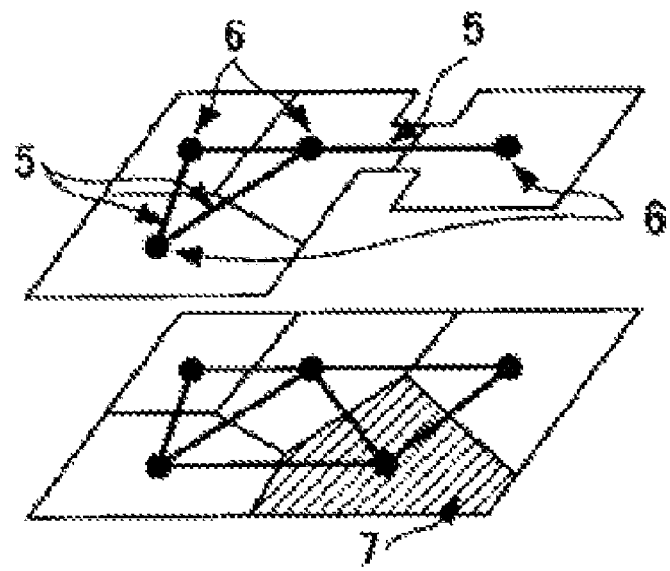
FIG. 2C shows the data which is generated by the procedure for generating a power supply mesh model.
Figure 2D:
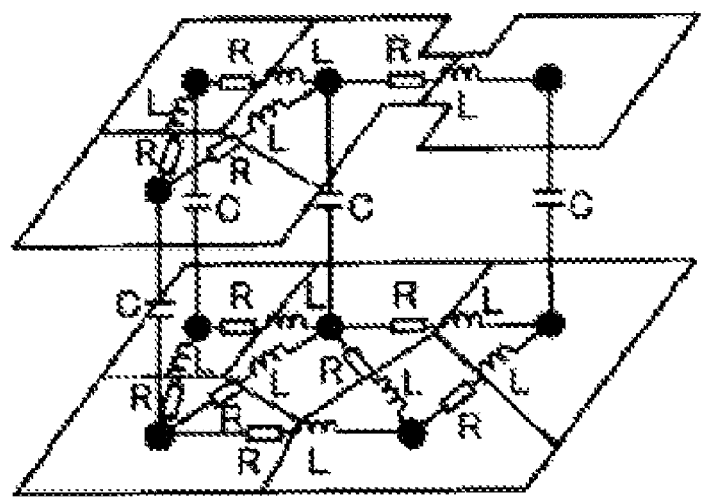
FIG. 2D shows the data which is generated by the procedure for generating a power supply mesh model.
Figure 4A:
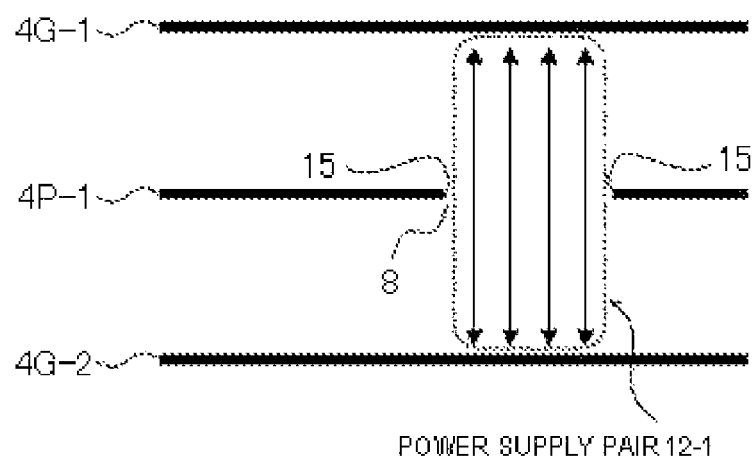
FIG. 4A is a cross-sectional view explaining the effect of the edge portion of the power supply planes.
Figure 4B:
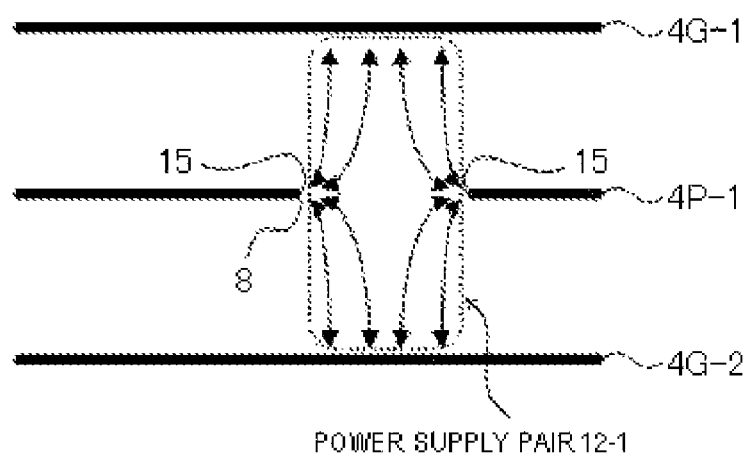
FIG. 4B is a cross-sectional view explaining the effect of the edge portion of the power supply planes.
Figure 5:
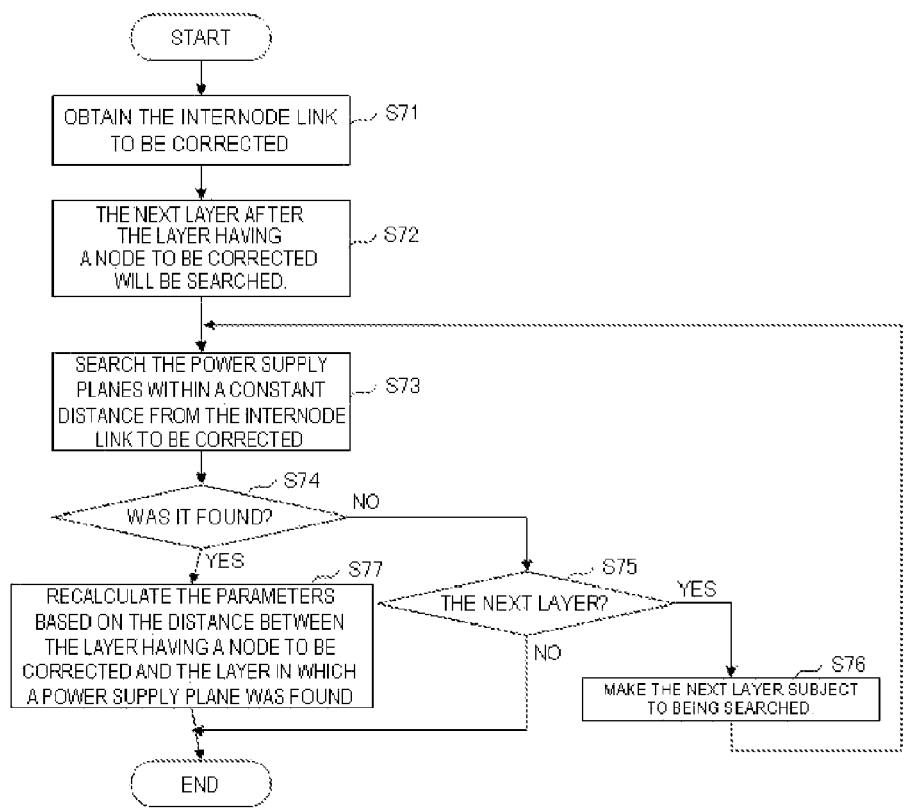
FIG. 5 shows the parameter correction process.

Reference may now be made in detail to embodiments of the present art, examples of which are illustrated in the accompanying drawings, wherein like reference numerals refer to like elements throughout.

In one embodiment, the shape of the power supply planes are created from the CAD data for the circuit board. The shape of the power supply planes is then extended by a predetermined width. In doing so, the outer shape of the power supply planes is expanded outward and the holes are expanded inward.

In one embodiment, power supply pairs are created using the data for the post-expansion power supply planes, the expanded power supply planes and power supply pair nodes are generated, and the mesh is split. In one embodiment, the parameters of at least one of the following are calculated: the inductance value, the capacitance value, or the resistance value between nodes. In one embodiment, the shape of each mesh is compared to the shape of the pre-expansion power supply planes, the mesh area corresponding to the expansion portion of the shape of the power supply planes in each mesh is calculated, and then the mesh area is used to correct the aforementioned parameters.

In one embodiment, the analysis precision is improved without increasing the processing time when designing a power supply or a ground layer analysis model suited for analyzing power supply noise generated in a circuit board.

Embodiment 1

Figure 6:
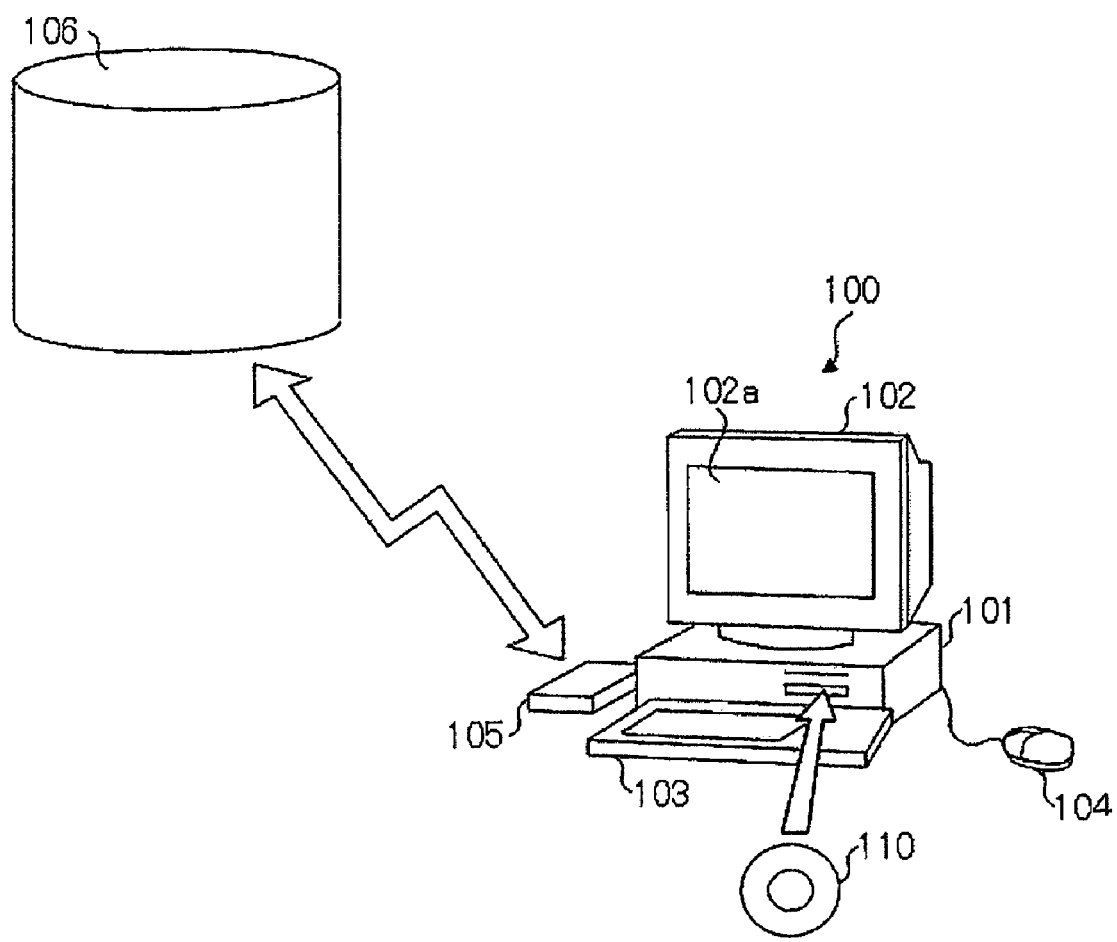
FIG. 6 shows a computer system which applies an embodiment of the present art.

The program, CAD system and computer readable storage media according to the present embodiment execute the design method according to embodiments. The present embodiment is applied to a computer system. FIG. 6 shows the computer system 100 to which the present embodiment is applied.

The computer system 100 comprises a main body 101. The main body 101 contains the CPU, disk drives, etc, a display 102, a keyboard 103, a mouse 104, and a modem 105. The display 102 displays images such as a CAD model on a display screen 102a according to designations from the main body 101. The keyboard 103 is used for inputting various information into the computer system 100. The mouse 104 is used for specifying particular positions on the display screen 102a in the display 102. The modem 105 accesses external databases, etc. and downloads programs, etc. which are stored in other computer systems.

A program (CAD software) having at least CAD functions in the computer system 100 is either stored in a portable storage medium such as a disk 110 or is downloaded from a storage medium 106 on another computer system using a communication apparatus such as the modem 105. The aforementioned program is input into the computer system 100 and compiled.

The aforementioned program operates as a CAD system comprising the computer system 100 (i.e., the CPU 201 explained hereinafter) which has the CAD function. The aforementioned portable storage medium includes portable storage media such as the disk 110, IC card memory, a magnetic disk such as a floppy (registered trademark) disk, a Magnetic Optical disk, or a CD-ROM. Also, the storage media which stores the aforementioned program includes all types of storage media that are accessible by a computer system which is connected through a communication apparatus such as the modem 105 or LAN or communication means.

Figure 7:
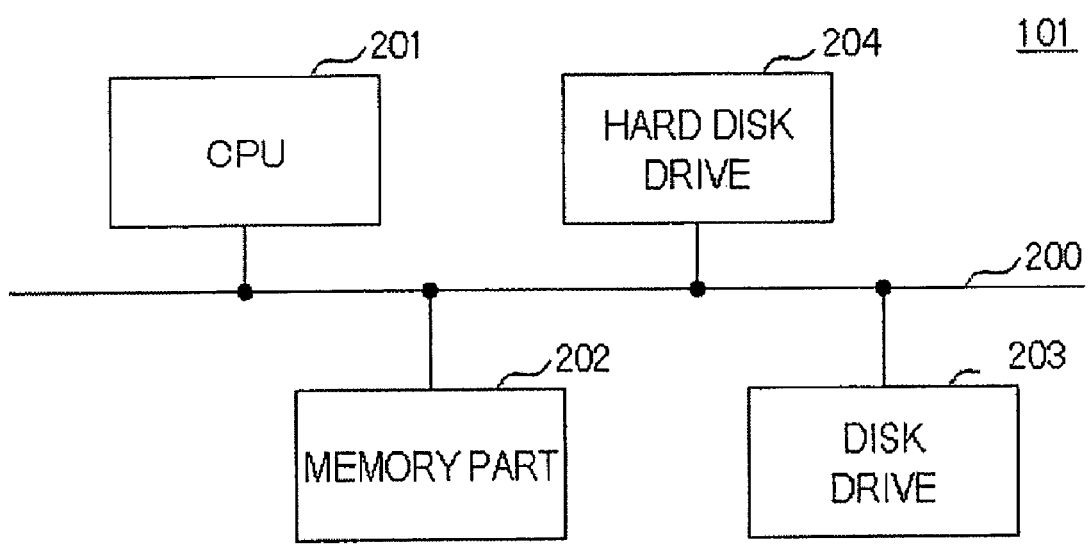
FIG. 7 shows the configuration of the main parts inside the main body of a computer system.

FIG. 7 shows the configuration of the main parts inside the main body 101 of a computer system 100. The main body 101 comprises the CPU 201 connected by a bus 200, a memory part 202 made up of memory such as RAM or ROM, a disk drive 203 and hard disk drive (HDD) 204 for the disk 110. In the present embodiment, the display 102, keyboard 103, and mouse 104 are connected to the CPU 201 through the bus 200. These items can also be directly connected to the CPU 201. Also, the display 102 can also be connected to the CPU 201 through a known graphic interface (not shown) which processes the input/output image data.

The keyboard 103 or mouse 104 is input means of the CAD system. The memory part 202, disk drive 203, and HDD 204 are storage means of the CAD system. The display 102 is output means for displaying CAD models, etc on the screen 102a.

The CPU 201 includes a creator for creating power supply planes in each layer of a circuit board, from CAD data of the circuit board, whereby the power supply planes form one power supply conductor interconnect and supply power or connect to ground. The CPU 201 also includes an expander for expanding the shape of the power supply planes by the predetermined width. The CPU 201 also includes a 2nd creator for creating by use of expansion power supply planes by the expanding means, power supply pairs which are formed by opposing portions wherein two power supply planes existing in different layers are separated by an insulator. The CPU 201 also includes a corrector for generating nodes for the expansion power supply planes and the power supply pairs, calculating a parameter between nodes, dividing the expansion power supply planes into mesh, calculating the parameters between the nodes, calculating a mesh area corresponding to an expansion portion of the power supply planes in each the mesh by comparing each mesh shape with the power supply plane shape, and correcting the parameter by use of the mesh area.

The computer system 100 is not limited to the configuration shown in FIG. 6 and FIG. 7. The present embodiment can also change the above-mentioned configuration to any known configuration. Also, the computer system 100 can be configured to not use the display 102, the keyboard 103, or the mouse 104.

Figure 8:
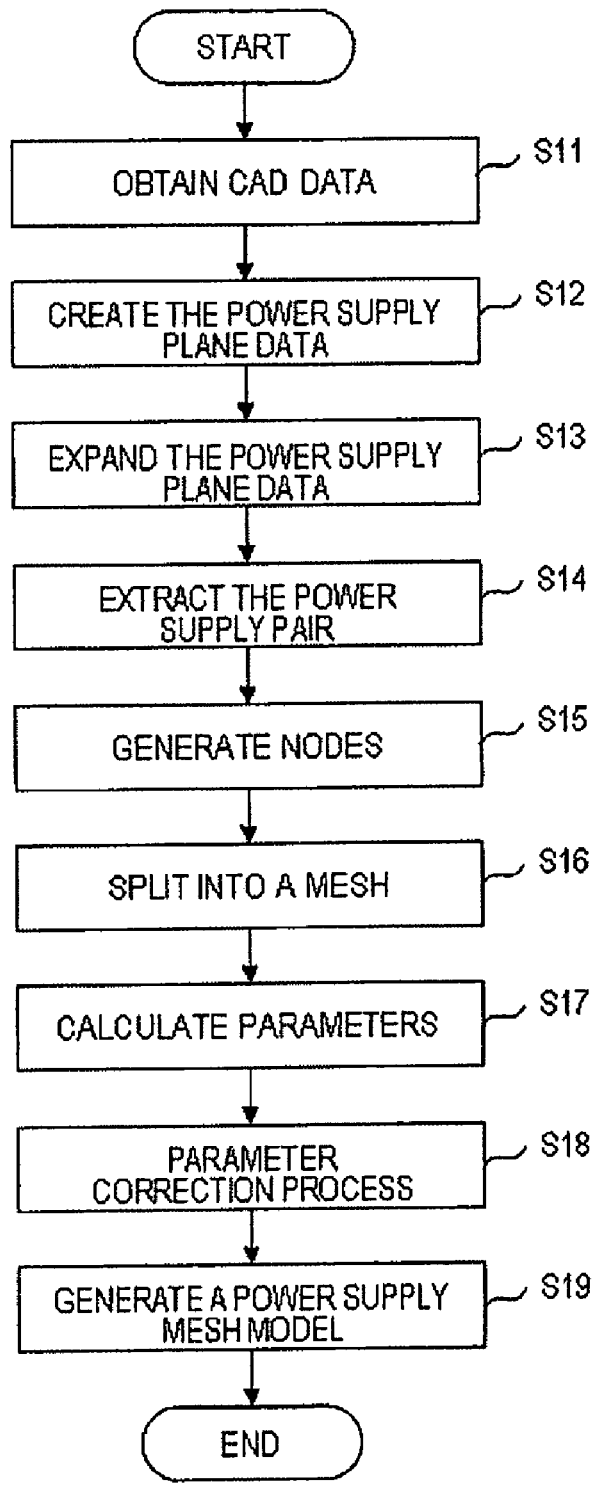
FIG. 8 shows the procedure for generating a power supply mesh model.

FIG. 8 shows the procedure for generating the power supply mesh model in the present embodiment. The power supply mesh model is generated when the CPU 201 runs the program in the present embodiment. Normally, the film thickness of multiple conductor layers provided in a circuit board such as a printed circuit board (PCB), a multichip module (MCM), or an LSI package is the same. Therefore, in the following explanation, the film thickness of each power supply conductor layer (power supply plane) is assumed to be the same.

The CPU 201 obtains the CAD data, which includes power supply relationships of the circuit board to be designed in operation S11. The CAD data is input from input means of the computer system 100 or storage means, or external storage means such as an external recording medium 106 of another computer system and the computer system 100. The CPU 201 composes the shape data for conductors having a connection relationship in each layer from the obtained CAD data in operation S12. The CPU 201 creates the data of the power supply plane (hereinafter simply referred to as power supply plane data).

The power supply planes form one power supply conductor interconnect in each layer. Shapes in the CAD data in which multiple polygons or line data are connected are defined as a single power supply plane. Power supply planes are power supply planes for supplying power supply voltage or ground planes for connecting to ground. Multiple power supply conductor layers which are provided on the same plane and supply the same power supply voltage are defined as a single power supply plane. Multiple power supply conductor layers which supply different power supply voltages are each defined as a separate power supply plane.

The CPU 201 expands the power supply plane data in operation S13. The value of the expansion width can also be set to a value which is proportional to the interlayer distance between the layer having the power supply planes to be expanded and the proximal layer. Also, the above-mentioned value of the expansion width can be set based on the distance from the LSI to be monitored. The above-mentioned value of the expansion width can be set by a table in which was saved the variation amount of expansion width appropriate for the distance from the LSI to be monitored. Furthermore, the method of setting the expansion width according to combinations of the former and the latter is shown below.

Figure 9:
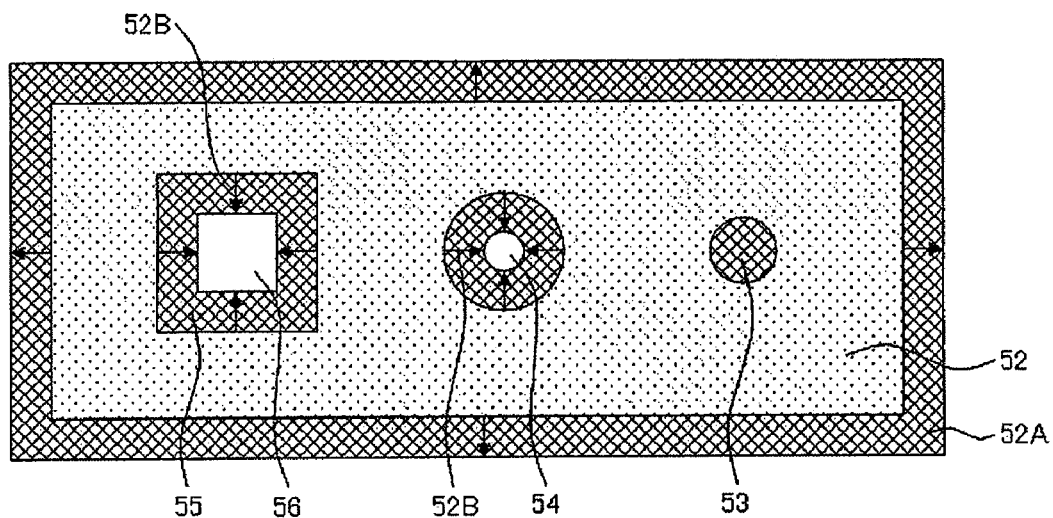
FIG. 9 shows a process for expanding the power supply plane data.

FIG. 9 shows the expansion processing of power supply plane data in operation S13. For example, the power supply plane 52 of the circuit board 51, which is a square having 500 mm to a side, has holes (or VIA clearance holes) 53, 54, 55 and the LSI 56 which are to be monitored. The diameter of holes 53 and 54 varies from 1 mm to 2 mm, for example. The size of hole 55 is determined according to the size of the LSI 56. The expansion processing of the power supply plane data in operation S13 includes the next operations ST1 through ST9.

In operation ST1, the CPU 201 extracts one power supply plane to be expanded (power supply plane 52 in this case) from the power supply plane data created in operation S12. The CPU 201 calculates interlayer distance d between the layer having the power supply plane 52 to be expanded and the proximal layer in operation ST2. The CPU 201 multiplies the interlayer distance d by the coefficient k to calculate the basic expansion width. Coefficient k is set according to the material of the circuit board.

The CPU 201 creates shape 52A by expanding the basic expansion width of the outer form of the power supply plane 52 outward in operation ST3.

The CPU 201 obtains the distance of the closest approach between hole 55 in the power supply plane 52 and the LSI 56 to be monitored in operation ST4. In operation ST5, the CPU 201 sets the expansion width appropriate for the distance obtained in operation ST4. Calculating the above-mentioned expansion width from the table in which is saved the correspondence between the distance from the LSI 56 and the amount of variation in the expansion width is also acceptable. This table is stored in storage means in the computer system 100, for example. In operation ST6, the CPU 201 creates shape 52B on the interior of holes 53 through 55 of the power supply plane 52. Shape 52B is created based on the expansion width which was determined in operation ST5. Hole 53 loses its shape as a hole in the process performed in operation ST6. The CPU 201 deletes hole data such as that for hole 53 in operation ST7.

In this way, the shape of the power supply plane 52 is expanded outward and the shape of holes 53 through 55 is expanded inward. The cross hatching in FIG. 9 shows shapes 52A and 52B, which were expanded by the present process.

The CPU 201 processes all hole data in the power supply plane as explained in operations ST4 through ST7.

FIG. 10 shows the effect and expansion width of the edge portion of the power supply planes using interlayer distance d. 52-1 through 52-3 indicate power supply planes, and 54 indicates a hole provided in the power supply plane 52-2. 61 indicates a power supply pair. This power supply pair is formed in the portion of power supply planes 52-1 and 52-3 that oppose each other across from an insulation layer (not shown here) through hole 54. Also, the arrows indicate the effect on the parameters for the edge portion of the power supply plane 52-2.

FIG. 10A shows a case in which interlayer distance d is long. Interlayer distance d in the upper part of FIG. 10A is long. Therefore, range E1, which is affected by the edge of the power supply plane 52-2, is wide. Width w, by which hole 54 of the power supply plane 52-2 was expanded inward, is proportional to interlayer distance d between the layer which has the power supply plane 52-2 and the proximal layer. In other words, w is calculated from the equation w=d×k.

FIG. 10B shows a case in which interlayer distance d is short. Interlayer distance d in the upper part of FIG. 10B is short. Therefore, range E1, which is affected by the edge of the power supply plane 52-2, is short. Similar to w above, width w, by which hole 54 of the power supply 52-2 was expanded inward, is calculated from the equation w=d×k, but the value of w is less here than it was in FIG. 10A.

Figures 11, 12:
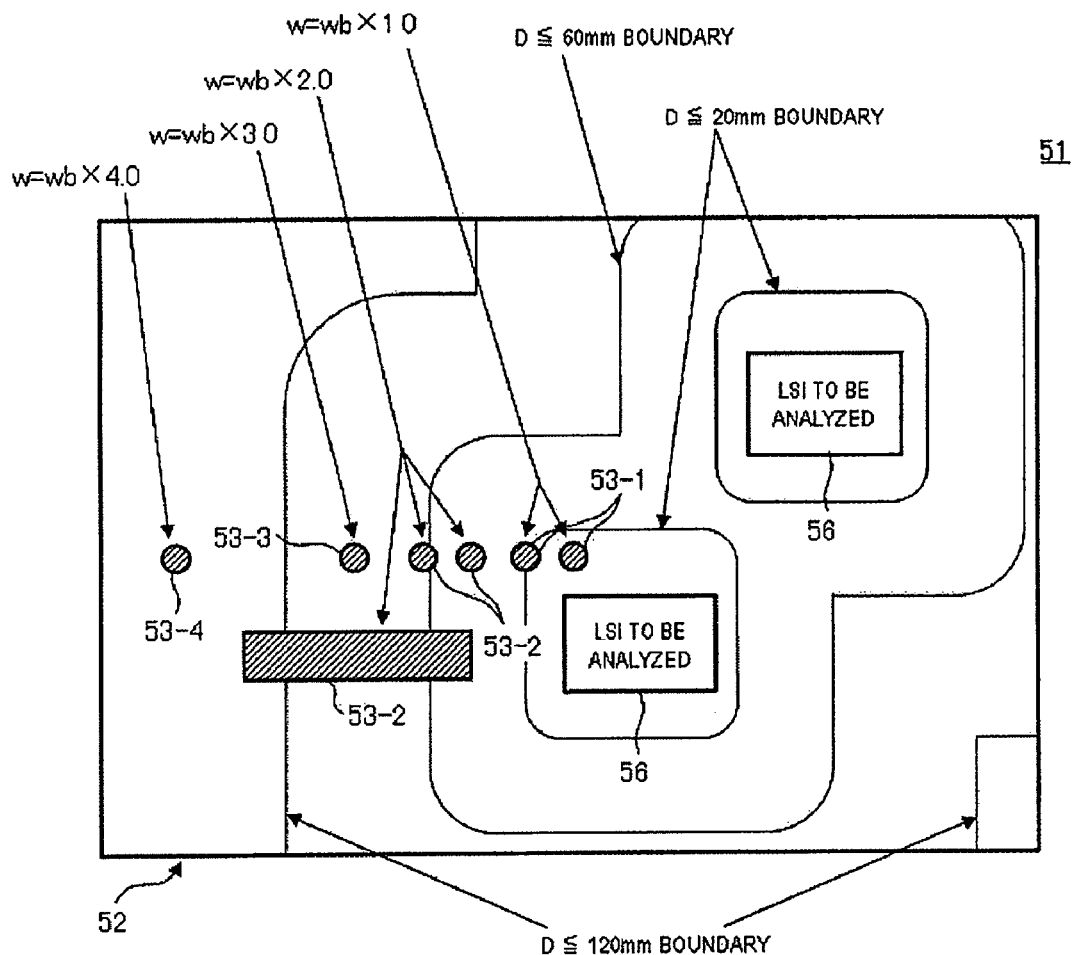
FIG. 11 shows the expanded width according to the distance from the LSI to be measured.
FIG. 12 shows the relationship between the distance from the LSI to be measured and the expanded width.

FIG. 11 shows the expansion width which is appropriate for the distance from the LSI 56 to be observed. Identical symbols were provided to identical portions in FIG. 9 and FIG. 11. FIG. 12 shows the relationship between the distance from the LSI 56 to be monitored and the expansion width thereof. The table in FIG. 12 shows the relationship between the distance from the LSI 56 and the variation in the expansion width thereof.

As shown in FIG. 11, the power supply plane 52 of the circuit board 51 has LSI 56 and holes 53-1 through 53-4. As shown in FIG. 12, expansion width [w] of the power supply plane 52 changes according to distance D from the LSI 56 to be monitored. When D<=20 mm for example, expansion width w of the power supply plane 52 is set to basic expansion width wb×1.0. Also, when 20 mm<D≦<=60 mm, the same expansion width w is set to basic expansion width wb×2.0. The value by which basic expansion width wb is multiplied increases as distance D from the LSI 56 to be monitored increases. This is because when analyzing the high frequency characteristics of the circuit board 51 (particularly 10 MHz or greater), the effect of the edge portion of the power supply plane 52 becomes small enough to be ignored. In FIG. 11, expansion width w of the power supply plane 52 relative to hole 53-1 is set to wb×1.0, expansion width w of the power supply plane 52 relative to hole 53-2 is set to wb×2.0, expansion width w of the power supply plane 52 relative to hole 53-3 is set to wb×3.0, and expansion width w of the power supply plane 52 relative to hole 53-4 is set to wb×4.0.

Note, the value of distance D is not limited as shown in FIG. 12. Distance D can be appropriately set according to the board material, film thickness of the power supply conductors, the width of lines leading from the LSI, and the diameter of VIA which connects to the lines leading from the LSI. Also, the value by which basic expansion width wb is multiplied is not limited as shown in FIG. 12.

In operation ST8, the CPU 201 saves the data for the post-expansion power supply plane shape. In operation ST9, the CPU 201 saves the data for the correspondence relationship between the pre-expansion power supply plane shape data and the post-expansion power supply plane shape data.

CPU 201 processes all power supply plane data in the circuit board as explained in operations ST1 through ST9.

The CPU 201 extracts power supply pairs based on the post-expansion power supply plane shape data in operation S14. The power supply pairs are the portions in which two power supply planes existing in different layers oppose each other with an insulation layer between them. Portions in which two power supply planes oppose each other through a hole in another power supply plane existing between them are also extracted as power supply pairs.

The CPU 201 generates nodes which are connected by node links in operation S15. Specifically, the CPU 201 generates nodes in pin connection locations and VIA connection locations relative to the power supply planes and power supply pairs. Furthermore, the CPU 201 generates nodes at regular intervals. Any nodes generated in this manner become analysis model nodes.

The CPU 201 splits the shape of power supply planes into mesh in operation S16. The mesh splitting process includes operations ST11 through ST18 below.

The CPU 201 selects one node which was generated in a power supply plane in operation ST11. The CPU 201 searches for the node which is proximal to the selected node in operation ST12. The CPU 201 generates a perpendicular bisector between the selected node and the proximal node thereto in operation ST13. The CPU 201 defines the polygon enclosed by this perpendicular bisector as the mesh area relative to the selected node. The CPU 201 defines the line connecting the target node and proximal node as the internode link (or node link).

The CPU 201 processes all nodes in the power supply plane as explained in operations ST11 through ST13.

The CPU 201 selects one node which was generated in a power supply pair in operation ST14. The CPU 201 searches for the node which is proximal to the selected node in operation ST15. The CPU 201 generates a virtual perpendicular bisector between the selected node and the proximal node thereto in operation ST16. The CPU 201 defines the polygon enclosed by this perpendicular bisector as the mesh area relative to the selected node.

The CPU 201 processes all nodes in the power supply pair as explained in operations ST11 through ST13.

The CPU 201 calculates the parameters for each inductance, each capacitance, and each resistance in operation S17. The CPU 201 corrects the above-mentioned parameters in operation S18. The parameter correction process in operation S18 is a simple arithmetic process and has a shorter processing time than the conventional parameter correction process performed by operation S7 in FIG. 1.

The resistance parameter calculation process and correction process, the inductance parameter calculation process and correction process, and capacitance parameter calculation process and correction process in operations S17 and S18 are performed as follows.

The resistance parameter calculation process and correction process performed in operations S17 and S18 include operations ST21 through ST25 below. In operation ST21, the CPU 201 selects one internode link created in operation ST13. In operation ST22, the CPU 201 calculates the internode resistance value from the internode distance of both ends of internode links (same as the length of the node links) and the mesh width. The width of the mesh used in the process in operation S22 has been expanded and holes have been embedded therein so that the resistance value between nodes is less than the actual resistance value. Therefore, in operations ST23 through ST25 below, the CPU 201 performs the parameter correction process.

In operation ST23, the CPU 201 performs AND operation on the mesh shape to be calculated and the pre-expansion power supply plane shape. In operation ST24, the CPU 201 calculates the area ratio of the mesh shape to be calculated to the shape that was calculated in operation ST23.

In operation ST25, the CPU 201 multiplies the resistance value calculated in operation ST22 by the area ratio calculated in operation ST24 and the coefficient to correct the resistance value. In this case, the coefficient is normally 1.0, but the coefficient can be set to any value.

The CPU 201 processes all node links in the power supply pair as explained in operations ST21 through ST25.

The inductance parameter calculation process and correction process performed in operations S17 and S18 includes operations ST31 through ST35 below. In operation ST31, the CPU 201 selects one internode link created in operation ST13. In operation ST32, the CPU 201 calculates the internode inductance value from the internode distance of both ends of internode links (same as the length of the node links), the mesh width, and the interlayer distance.

Similar to the case of the resistance value, the meshes used by the process in operation ST32 has been expanded and holes have been embedded therein so that the inductance value between nodes is less than the actual inductance value. In operations ST33 through ST35 below, the CPU 201 performs the parameter correction process.

In operation ST33, the CPU 201 performs AND operation on the mesh shape to be calculated and the pre-expansion power supply plane shape. In operation ST34, the CPU 201 calculates the area ratio of the mesh shape to be calculated to the shape that was calculated in operation ST33. In operation ST35, the CPU 201 multiplies the inductance value calculated in operation ST32 by the area ratio calculated in operation ST34 and the coefficient to correct the inductance value. In this case, the coefficient is normally 1.0, but the coefficient can be set to any value.

The CPU 201 processes all node links as explained in operations ST31 through ST35.

The capacitance parameter calculation process and correction process performed in operations S17 and S18 include operations ST41 through ST45 below. In operation ST41, the CPU 201 selects the mesh of the power supply pair created in operation ST16. In operation ST42, the CPU 201 calculates the internode capacitance value from the mesh area and the interlayer distance. In the mesh area used by the process in operation ST42, the mesh width has been expanded and holes have been embedded so that the capacitance value between nodes is calculated to be a value greater than the actual capacitance value. Therefore, in operations ST43 through ST45 below, the CPU 201 performs the parameter correction process.

In operation ST43, the CPU 201 performs AND operation on the mesh shape to be calculated and the pre-expansion power supply plane shape. In operation ST44, the CPU 201 calculates the area ratio of the mesh shape to be calculated to the shape calculated by the AND operation in operation ST43. In operation ST45, the CPU 201 divides the capacitance value calculated in operation ST42 by the area ratio calculated in operation ST44 and the coefficient to correct the capacitance value. In this case, the coefficient is normally 1.0, but the coefficient can be set to any value.

The CPU 201 processes all node links as explained in operations ST41 through ST45.

The CPU 201 generates a power supply mesh model, or an analysis model in operation S19, in which in each mesh was converted into an equivalent circuit of an inductance, capacitance, or resistance. The power supply mesh model generation process in operation ST19 includes the next operations ST51 through ST53. In operation ST51, the CPU 201 creates a mesh model in which the nodes in power supply planes are connected by the inductance calculated in operation ST35 and the capacitance calculated in operation ST45. In operation ST52, the CPU 201 adds to the mesh model created in operation ST51 a mesh model in which the interlayer nodes of power supply pairs are connected by the resistance calculated in operation ST25. In operation ST53, the CPU 201 adds to the mesh model created in operation ST52 a VIA mesh model, and then generates a power supply mesh model (analysis model).

According to the present embodiment, miniature holes are eliminated by expanding the power supply planes. As a result, the present embodiment can suppress the occurrence of miniature power supply pairs having miniature holes passing through.

In portions close to the end face of a power supply plane, the edge portion of power supply planes on the perimeter of power supply pairs has a greater effect than power supply planes located between power supply planes configuring power supply pairs. Therefore, post-expansion power supply planes have a practical influence. Consequently, searching for power supply planes proximal to the power supply pairs to correct the parameters as in the conventional example is not necessary.

In the present embodiment, the parameters for the inductance value, the capacitance value, and the resistance value are corrected according to the mesh area which corresponds to the expansion portion of the power supply planes in each mesh. Therefore, the present embodiment can suppress reduced precision resulting when the power supply planes are expanded.

Because the correspondence between the data for the post-expansion power supply plane shape and the pre-expansion power supply plane shape is saved as data, in the present embodiment, the search for proximal power supply planes that was performed in the conventional example is not necessary and the parameter correction process does not require much time.

High frequency characteristics of 10 MHz or greater for the circuit board are easily affected by the characteristics of the pattern shape leading from the LSI to be monitored, the VIA shape, or the capacitors (bypass capacitors) mounted in close proximity to the LSI. Therefore, expanding the power supply plane width of the portion which is not closed to the LSI does not have a great effect on the analysis precision. The power supply plane width can be greatly expanded according to the distance from the LSI. If the power supply plane width increases, the number of eliminated holes increases as well. As a result, the number of power supply pairs created through holes can be reduced further.

Figure 13:
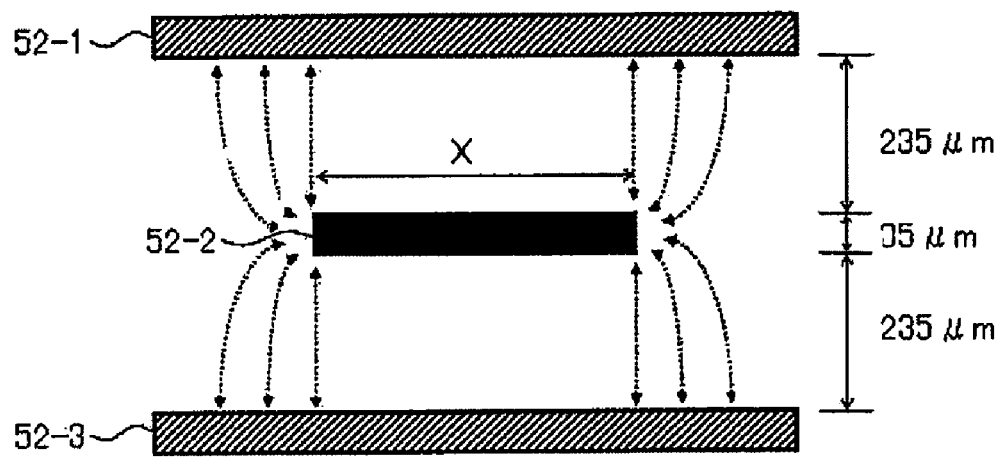
FIG. 13 is a cross-sectional view explaining the calculation of the impedance value using a known 2D field solver that can take into account the effect of the edge portion of the power supply planes.
Figure 14:
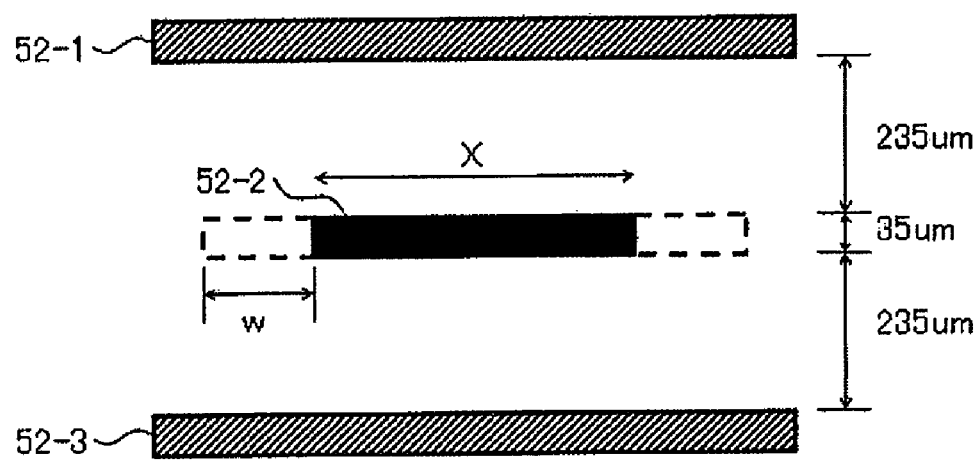
FIG. 14 shows the calculation of the inductance value that does not take into account the effect of the edge portion of the power supply planes.

Next, the effect of the present embodiment will be explained along with FIG. 13 through FIG. 16. FIG. 13 is a cross-sectional view explaining the calculation of the impedance value using a known 2D field solver that can take into account the effect of the edge portion of the power supply plane 52-1. FIG. 14 is a cross-sectional view explaining the calculation of the inductance value that does not take into account the effect of the edge portion of the power supply plane 52-1. Identical symbols were provided to identical portions in FIG. 10, FIG. 13, and FIG. 14. In FIG. 13 and FIG. 14, the distance between power supply planes 52-1 and 52-2 and the distance between power supply planes 52-2 and 52-3 are both 234 microns. Width X of the power supply plane 52-2 is 1000 microns or 2000 microns.

Figure 15:
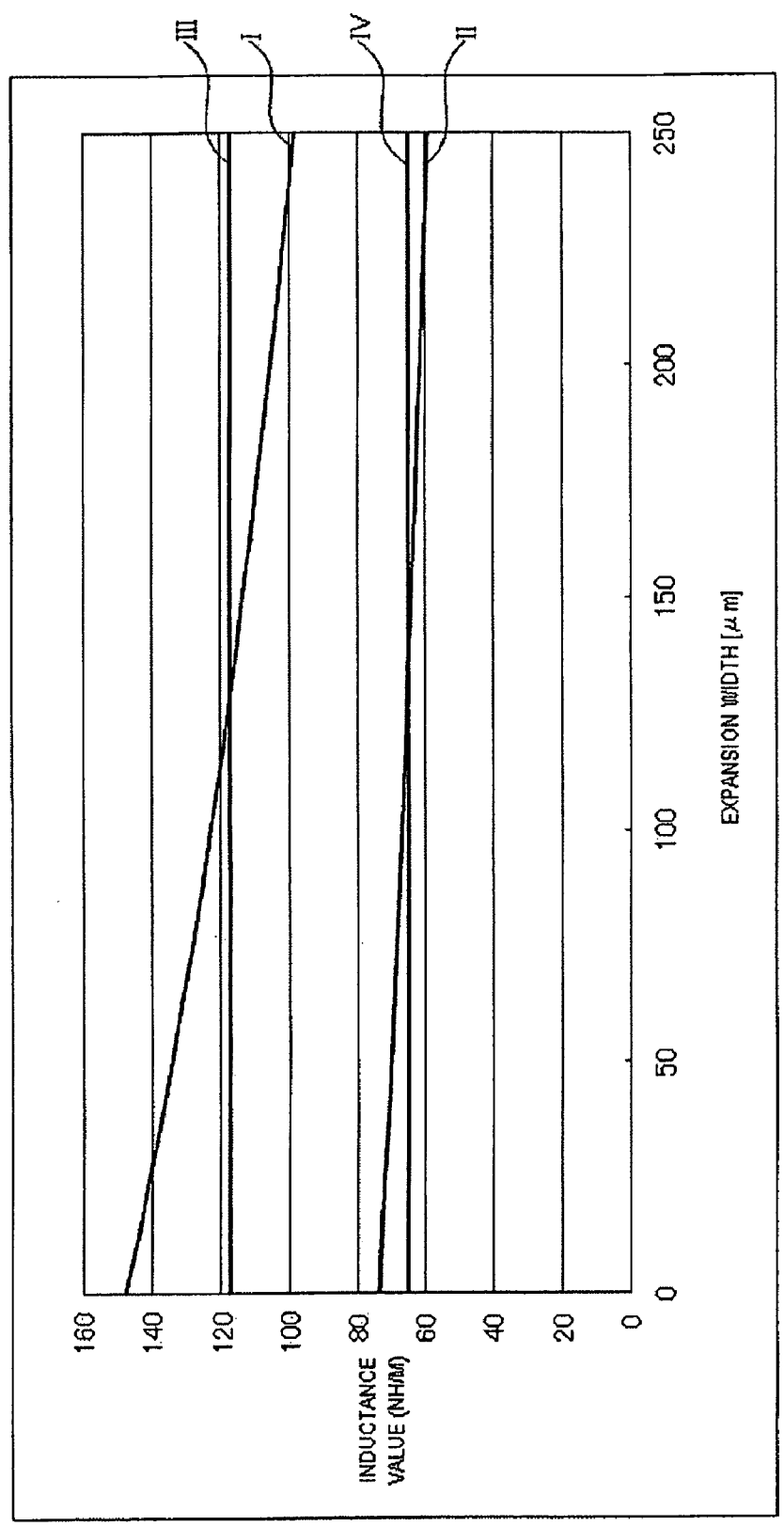
FIG. 15 shows the calculation results of the inductance value that does and does not take into account the effect of the edge portion of the power supply planes.

FIG. 15 shows the calculation results of the impedance value obtained from the example in FIG. 13 and the calculation results of the inductance value obtained from the example in FIG. 14. In FIG. 15, the ordinate axis indicates the inductance value (nH/m), and the abscissa indicates the expansion width w (microns). I and II in FIG. 15 indicate the calculation results for X=1000 microns and X=2000 microns in FIG. 14, respectively, when expansion width w was varied from 0 to 250 microns. III and IV indicate the calculation results for X=1000 microns and X=2000 microns in FIG. 13, respectively, when using a 2D field solver. FIG. 15 shows that when expansion width w is set to approximately 130 microns in power supply planes like those in FIG. 13 and FIG. 14, the calculation results of each impedance value become nearly the same. In other words, FIG. 15 shows that by setting expansion width w to approximately 130 microns, the inductance value can be calculated without being affected by the edge portion of the power supply plane 52-2.

Note, because the present embodiment assumes that high frequency characteristics of 10 MHz or greater for the circuit board 51 will be analyzed, the inductance value, which has a particularly great influence on the analysis results, was verified. In the case of one skilled in the art, however, it should become clear that it is possible to obtain nearly the same calculation results for the parameter value which takes into account the effect of the edge portion of the power supply plane 52-2 as for other parameters such as the resistance value and the capacitance value. Nearly the same calculation results, for example, may be obtained for the parameter value by appropriately setting the above-mentioned expansion width w, or by using a method of calculating a parameter value which does not take into account the effect of the edge portion of the power supply plane 52-2.

Figure 16:
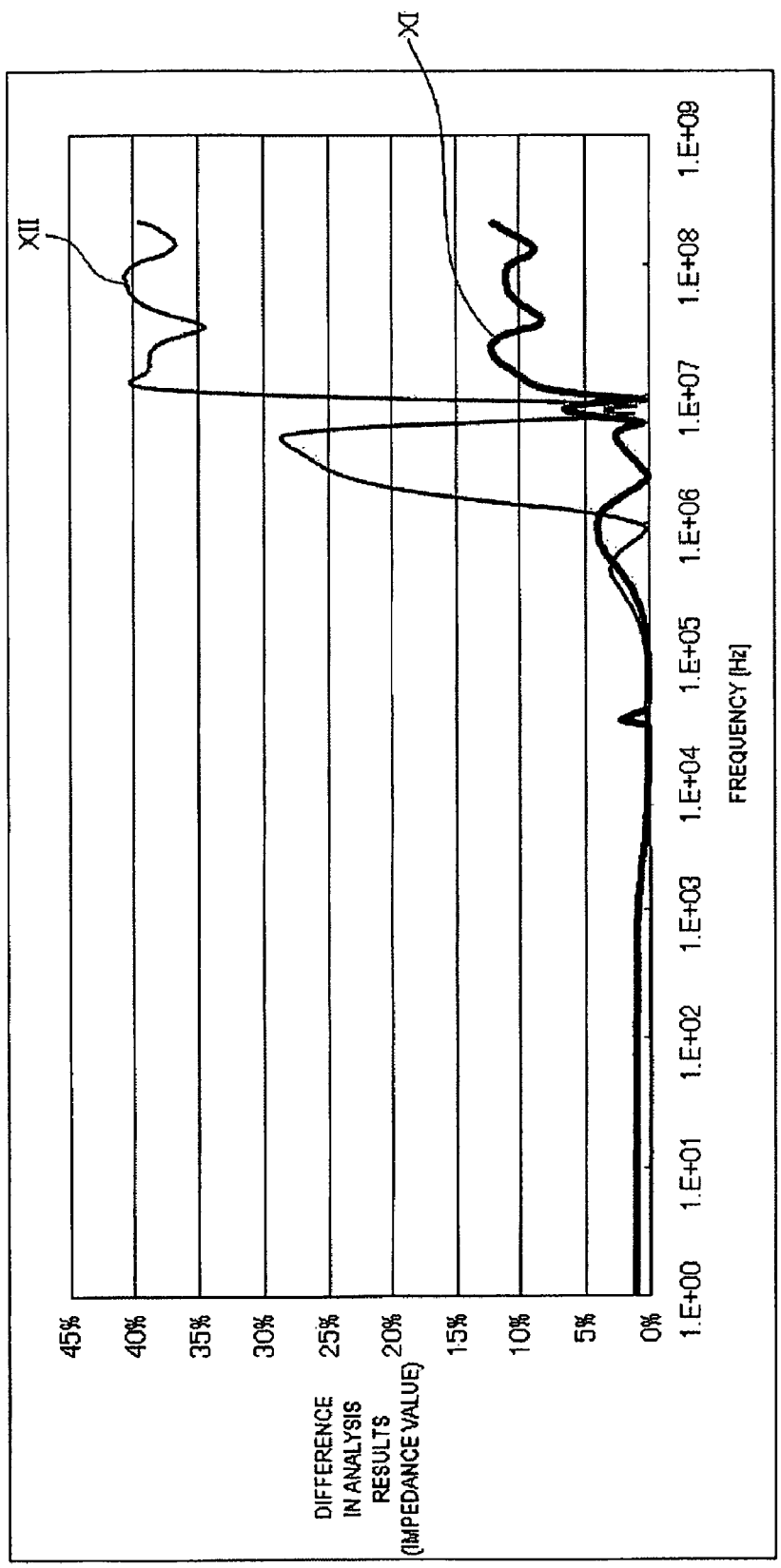
FIG. 16 compares the analysis results of a conventional example with the present embodiment.

FIG. 16 shows a comparison of the analysis results between FIG. 1 and FIG. 8. The ordinate axis of FIG. 16 shows the difference (%) of the analysis results (impedance value) relative to the actual measurement value of the circuit board that was actually created. The abscissa of the same figure shows the frequency (Hz), wherein "1E+0i" (i=0 through 9) expresses $1.0 \times 10^i$. In FIG. 16, XI indicates the analysis results according to the present embodiment. XII indicates the analysis results of the conventional example shown in FIG. 1. The parameter correction process of operation S7 was not performed in the analysis results of the conventional example.

As shown in FIG. 16, the analysis results of the conventional example have an error of 40% or more. However, even though a parameter correction process like that in the conventional example was not performed in the present embodiment, the analysis results of the present embodiment only have error of less than 15%. Note, error of about 1% which occurs in multiplied frequency areas can be corrected by performing a correction process on resistance values based on the area ratio of the pre- to post-expansion power supply planes.

The present embodiment has been explained herein before, but it goes without saying that the present art is not limited to the above-mentioned embodiment and that various modifications and improvements are possible within the scope of the present art.

According to the present art, it is possible to realize a design method and apparatus, CAD system, program, and storage medium wherein it becomes possible to improve the analysis precision without increasing the processing time when designing a power supply or ground analysis model suited for analyzing power supply noise generated in a circuit board.

Although a few preferred embodiments of the present art have been shown and described, it would be appreciated by those skilled in the art that changes may be made in these embodiments without departing from the principles and spirit of the art, the scope of which is defined in the claims and their equivalents.

What is claimed is:

1. A method for designing an electronics device by a computer comprising:
   creating power supply planes in each layer of a circuit board, from CAD data of the circuit board, whereby the power supply planes form one power supply conductor interconnect and supply power or connect to ground;
   expanding the power supply planes by a predetermined width;
   creating power supply pairs using the expanded power supply planes by forming opposing portions of two power supply planes in different layers separated by an insulator;
   generating nodes for the expanded power supply planes and the power supply pairs, calculating a parameter between nodes, dividing the expanded power supply planes into mesh, calculating the parameters between the nodes, calculating a mesh area corresponding to an expanded portion of the power supply planes in each the mesh by comparing each mesh shape with the power supply plane shape, and correcting the parameter by use of the mesh area; and
   designing the electronics device using the mesh area.

2. The method according to claim 1, comprising further:
   expanding the power supply plane toward an outside of an outer of the power supply plane.

3. The method according to claim 1 said power supply plane, comprising further:
   expanding the power supply plane toward the inside of a hole in the power supply plane.

4. The method according to claim 1,
   wherein the predetermined width is proportional to a distance between the layer having the power supply planes and a proximal layer to the power supply planes.

5. The method according to claim 1,
   wherein the predetermined width is appropriate for a distance from the LSI to be monitored on said circuit board.

6. The method according to claim 1, further comprising:
   generating the power supply mesh model as said analysis model; and
   converting the power supply mesh into an equivalent circuit of the parameters.

7. The method according to claim 1,
   wherein the parameter is selected from the group consisting of an inductance value, a capacitance value, and a resistance value.

8. A non-transitory computer readable storage medium storing a program to cause a computer to operate as a design supporting apparatus and execute operations, the operations comprising:
   creating power supply planes in each layer of a circuit board, from CAD data of the circuit board, whereby the power supply planes form one power supply conductor interconnect and supply power or connect to ground;
   expanding the power supply planes by a predetermined width;
   creating power supply pairs using the expanded power supply planes by forming opposing portions of two power supply planes in different layers separated by an insulator;
   generating nodes for the expanded power supply planes and the power supply pairs, calculating a parameter between nodes, dividing the expanded power supply planes into mesh, calculating the parameters between the nodes, calculating a mesh area corresponding to an expanded portion of the power supply planes in each the mesh by comparing each mesh shape with the power supply plane shape, and correcting the parameter by use of the mesh area; and
   designing the electronics device using the mesh area.

9. The computer-readable recording medium according to claim 8, further comprising:
   expanding the power supply plane toward an outside of an outer of the power supply plane.

10. The computer-readable recording medium according to claim 8,
    expanding the power supply plane toward the inside of a hole in the power supply plane.

11. The computer-readable recording medium according to claim 8,
    wherein the predetermined width is proportional to a distance between the layer having the power supply planes and a proximal layer to the power supply planes.

12. The computer-readable recording medium according to claim 8, further comprising:
    generating the power supply mesh model as said analysis model; and
    converting the power supply mesh into an equivalent circuit of the parameters.

13. The computer-readable recording medium according to claim 8,
    wherein the parameter is selected from the group consisting of an inductance value, a capacitance value, and a resistance value.

14. A design supporting system for designing an electronics device comprising:
    creating power supply planes in each layer of a circuit board, from CAD data of the circuit board, whereby the power supply planes form one power supply conductor interconnect and supply power or connect to ground;
    expanding the power supply planes by a predetermined width;
    creating power supply pairs using the expanded power supply planes by forming opposing portions of two power supply planes in different layers separated by an insulator;
    generating nodes for the expanded power supply planes and the power supply pairs, calculating a parameter between nodes, dividing the expanded power supply planes into mesh, calculating the parameters between the nodes, calculating a mesh area corresponding to an expanded portion of the power supply planes in each the mesh by comparing each mesh shape with the power supply plane shape, and correcting the parameter by use of the mesh area; and
    designing the electronics device using the mesh area.

* * * * *

UNITED STATES PATENT AND TRADEMARK OFFICE
CERTIFICATE OF CORRECTION

| | | |
|---|---|---|
| PATENT NO. | : 7,975,251 B2 | |
| APPLICATION NO. | : 12/041216 | |
| DATED | : July 5, 2011 | |
| INVENTOR(S) | : Shogo Fujimori | |

It is certified that error appears in the above-identified patent and that said Letters Patent is hereby corrected as shown below:

Title Page, Item (54) and at Column 1, lines 1-3, Title, Delete "METHOD, RECORDING MEDIUM, AND DESIGN SUPPORT SYSTEM FOR DESIGNING AN ELECTRONICS DEVICE" and insert --DESIGN METHOD, RECORDING MEDIUM, AND DESIGN SUPPORT SYSTEM FOR DESIGNING AN ELECTRONICS DEVICE--, therefor.

Title Page, Item (57) Abstract, Line 3, Delete "boards" and insert --board,--, therefor.

Signed and Sealed this
Twenty-fifth Day of October, 2011

David J. Kappos
*Director of the United States Patent and Trademark Office*